(12) United States Patent
Itkin et al.

(10) Patent No.: US 11,055,104 B2
(45) Date of Patent: Jul. 6, 2021

(54) NETWORK-ADAPTER CONFIGURATION USING OPTION-ROM IN MULTI-CPU DEVICES

(71) Applicant: Mellanox Technologies, Ltd., Yokneam (IL)

(72) Inventors: Yuval Itkin, Zoran (IL); Liran Liss, Misgav Am (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 66 days.

(21) Appl. No.: 16/660,838

(22) Filed: Oct. 23, 2019

(65) Prior Publication Data

US 2021/0124590 A1 Apr. 29, 2021

(51) Int. Cl.
*G06F 9/4401* (2018.01)
*G06F 13/40* (2006.01)

(52) U.S. Cl.
CPC ........ *G06F 9/4405* (2013.01); *G06F 13/4027* (2013.01)

(58) Field of Classification Search
CPC ............................. G06F 9/4405; G06F 13/4027
See application file for complete search history.

(56) References Cited

U.S. PATENT DOCUMENTS

| | | | |
|---|---|---|---|
| 7,797,696 B1 * | 9/2010 | Nallagatla | G06F 8/65 717/168 |
| 10,303,635 B2 | 5/2019 | Itkin et al. | |
| 10,318,312 B2 | 6/2019 | Itkin et al. | |
| 2003/0135350 A1 * | 7/2003 | Cheston | G06F 21/572 702/186 |
| 2003/0233450 A1 | 12/2003 | Carley | |
| 2004/0193738 A1 * | 9/2004 | Natu | G06F 9/4411 710/1 |
| 2005/0216715 A1 | 9/2005 | Matheny et al. | |
| 2013/0080606 A1 * | 3/2013 | Lerner | G06F 15/177 709/220 |

(Continued)

OTHER PUBLICATIONS

PCI Express® Base Specification, Revision 3.1, pp. 1-1073, Mar. 2014.

(Continued)

*Primary Examiner* — Glenn A. Auve
(74) *Attorney, Agent, or Firm* — Kligler & Associates Patent Attorneys Ltd

(57) ABSTRACT

A network adapter includes one or more network ports, multiple bus interfaces and a processor. The network ports are configured to communicate with a communication network. The bus interfaces are configured to communicate with multiple respective CPUs of a multi-CPU device. The processor is included in the network adapter and is configured to support an Option-ROM functionality, in which the network adapter holds Option-ROM program instructions that are loadable and executable by the multi-CPU device during a boot process, to expose the support of the Option-ROM functionality to the multi-CPU device over only a single bus interface, selected from among the multiple bus interfaces, and, by loading the Option-ROM program instructions to the multi-CPU device, to cause the multi-CPU device to present to a user only a single, non-redundant set of commands for managing all the multiple bus interfaces of the network adapter via the single bus interface.

27 Claims, 3 Drawing Sheets

(56) References Cited

U.S. PATENT DOCUMENTS

| | | |
|---|---|---|
| 2013/0080754 A1 | 3/2013 | Ganesh et al. |
| 2013/0086371 A1 | 4/2013 | Bisht et al. |
| 2015/0172112 A1 | 6/2015 | Itkin et al. |
| 2015/0215343 A1 | 7/2015 | Itkin et al. |
| 2016/0127197 A1 | 5/2016 | Yethadka et al. |
| 2016/0248619 A1 | 8/2016 | Itkin |
| 2016/0248620 A1 | 8/2016 | Itkin |
| 2017/0068636 A1 | 3/2017 | Vishwanathan et al. |

OTHER PUBLICATIONS

DMTF—"Management Component Transport Protocol (MCTP) Base Specification", DMTF Document DSP0236, version 1.3.0, pp. 1-94, Nov. 24, 2016.

DMTF—"Management Component Transport Protocol (MCTP) PCIe VDM 25 Transport Binding Specification," DMTF Document DSP0238, version 1.0.1, pp. 1-19, Dec. 11, 2009.

DMTF—"NC-SI over MCTP Binding Specification", DMTF Document DSP0261, version 1.1.0, pp. 1-31, Mar. 21, 2015.

DMTF—"Management Component Transport Protocol (MCTP) SMBus/I2C Transport Binding Specification", DMTF Document DSP0237, version 1.0.0., pp. 1-42, Jul. 28, 2009.

INTEL Corporation., "Preboot Execution Environment (PXE) Specification", version 2.1, pp. 1-103, Sep. 20, 1999.

DMTF—"Server Management Command Line Protocol (SM CLP) Specification", DMTF Document DSP0214, version 1.0.2, pp. 1-164, Mar. 7, 2007.

INTEL, "IPMI—Platform Management FRU Information Storage Definition", v1.0 Document Revision 1.2, pp. 1-36, Feb. 28, 2013.

Unified Extensible Firmware Interface Specification, version 2.6, Chapter 3 (pp. 69-92), Jan. 2006.

Unified Extensible Firmware Interface Specification, version 2.6, Chapter 6 (pp. 127-232), Jan. 2006.

Unified Extensible Firmware Interface Specification, version 2.6, Chapter 10 (pp. 367-454), Jan. 2006.

Unified Extensible Firmware Interface Specification, version 2.6, Chapter 13 (pp. 687-788), Jan. 2006.

EP Application # 20196281.8 Search Report dated Mar. 12, 2021.

\* cited by examiner

NETWORK-ADAPTER CONFIGURATION USING OPTION-ROM IN MULTI-CPU DEVICES

FIELD OF THE INVENTION

The present invention relates generally to network adapters, and particularly to methods and systems for network-adapter configuration in multi-CPU devices.

BACKGROUND OF THE INVENTION

Servers and computers in general perform a predefined bootstrapping ("boot") process upon power-up.

In a typical boot process, the computer's Built-In Operating System (BIOS) initializes the various peripherals of the computer, e.g., network adapter, graphics processor and disks. Some computer peripherals support "Option-ROM"—program code, typically stored in on-board non-volatile memory, which is called and executed by the BIOS. Option-ROM is also sometimes referred to as "Expansion ROM." One example use-case of Option-ROM is network-boot Option-ROM, which is stored in a network adapter and enables the BIOS to load the computer's operating system over a network from a remote location.

U.S. Pat. No. 10,318,312, whose disclosure is incorporated herein by reference, describes techniques for supporting Option-ROM in Socket-Direct network adapters. A network adapter includes one or more network ports, multiple bus interfaces, and a processor. The network ports are configured to communicate with a communication network. The bus interfaces are configured to communicate with multiple respective Central Processing Units (CPUs) that belong to a multi-CPU device. The processor is configured to support an Option-ROM functionality, in which the network adapter holds Option-ROM program instructions that are loadable and executable by the multi-CPU device during a boot process, and, in response to a request from the multi-CPU device to report the support of the Option-ROM functionality, to report the support of the Option-ROM functionality over only a single bus interface, selected from among the multiple bus interfaces connecting the network adapter to the multi-CPU device.

SUMMARY OF THE INVENTION

An embodiment of the present invention that is described herein provides a network adapter including one or more network ports, multiple bus interfaces and a processor. The one or more network ports are configured to communicate with a communication network. The multiple bus interfaces are configured to communicate with multiple respective Central Processing Units (CPUs) of a multi-CPU device. The processor is included in the network adapter and is configured to support an Option-ROM functionality, in which the network adapter holds Option-ROM program instructions that are loadable and executable by the multi-CPU device during a boot process. The processor is configured to expose the support of the Option-ROM functionality to the multi-CPU device over only a single bus interface, selected from among the multiple bus interfaces, and, by loading the Option-ROM program instructions to the multi-CPU device, to cause the multi-CPU device to present to a user only a single, non-redundant set of commands for managing all the multiple bus interfaces of the network adapter via the single bus interface.

Typically, in response to a request from the multi-CPU device to report the support of the Option-ROM functionality, the processor is configured to expose the support of the Option-ROM functionality over only the single bus interface, even though all the multiple bus interfaces of the network adapter support the Option-ROM functionality. In some embodiments, the single, non-redundant set of commands includes a single, non-redundant set of one or more configuration menus for managing at least the multiple bus interfaces.

In some embodiments, the multiple bus interfaces are configured to communicate with the multi-CPU device over a Peripheral Component Interconnect Express (PCIe) bus. In an embodiment, the single, non-redundant set of commands includes a command for managing a local parameter of a selected PCIe Physical Function (PF). In another embodiment, the single, non-redundant set of commands includes a command for managing a global parameter pertaining to two or more PCIe Physical Functions (PFs) associated with one or more of the bus interfaces. In a disclosed embodiment, the single, non-redundant set of commands includes a command for managing a global resource of the network adapter.

In some embodiments, the multi-CPU device includes a multi-CPU server.

In some embodiments, the processor is configured to present the single, non-redundant set of commands by presenting a single, non-redundant set of configuration menus to the user. In an example embodiment, the processor is configured to present the set of configuration menus in association with the single selected bus interface, including presenting, within the set of configuration menus, one or more sub-menus for managing one or more bus interfaces other than the single selected bus interface.

In another embodiment, the processor is configured to expose the network adapter to an operating system of the multi-CPU device as multiple logical network adapters corresponding to the multiple bus interfaces. In yet another embodiment, the processor is configured to expose the network adapter to an operating system of the multi-CPU device as a single logical network adapter that is shared by the multiple bus interfaces. In still another embodiment, the processor is configured to select, in response to user input, whether to expose the network adapter to an operating system of the multi-CPU device as multiple logical network adapters corresponding to the multiple bus interfaces, or as a single logical network adapter that is shared by the multiple bus interfaces.

There is additionally provided, in accordance with an embodiment of the present invention, a method including, in a network adapter, communicating with a communication network via one or more ports, and communicating via multiple bus interfaces with multiple respective Central Processing Units (CPUs) of a multi-CPU device. An Option-ROM functionality is supported in the network adapter, by holding in the network adapter Option-ROM program instructions that are loadable and executable by the multi-CPU device during a boot process. The support of the Option-ROM functionality is exposed to the multi-CPU device over only a single bus interface, selected from among the multiple bus interfaces. By loading the Option-ROM program instructions to the multi-CPU device, the multi-CPU device is caused to present to a user only a single, non-redundant set of commands for managing all the multiple bus interfaces of the network adapter via the single bus interface.

There is also provided, in accordance with an embodiment of the present invention, a computer software product, the product including a tangible non-transitory computer-readable medium in which program instructions are stored, which instructions, when read by a processor of a network adapter that is configured to communicate with a communication network via one or more network ports and to communicate with multiple respective Central Processing Units (CPUs) of a multi-CPU device via multiple bus interfaces, cause the processor to support an Option-ROM functionality, in which the network adapter holds Option-ROM program instructions that are loadable and executable by the multi-CPU device during a boot process, to expose the support of the Option-ROM functionality to the multi-CPU device over only a single bus interface, selected from among the multiple bus interfaces, and, by loading the Option-ROM program instructions to the multi-CPU device, to cause the multi-CPU device to present to a user only a single, non-redundant set of commands for managing all the multiple bus interfaces of the network adapter via the single bus interface.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved network adapters and associated methods, for use in multi-CPU devices. The disclosed techniques enhance the support of Option-ROM functionality in such network adapters and multi-CPU devices.

In some embodiments, a network adapter is used for connecting a multi-CPU device, e.g., a multi-CPU server, to a communication network. In particular, the network adapter is configured to communicate with two or more of the CPUs of the multi-CPU device directly, e.g., over direct respective PCIe links. The network adapter supports an Option-ROM functionality, i.e., holds Option-ROM program code that can be loaded and executed by the BIOS of the multi-CPU device during a boot process.

The capability to communicate directly between the network adapter and multiple individual CPUs (an architecture that is sometimes referred to as "Socket-Direct") is advantageous with regards to communication performance. For managing the support of Option-ROM and for generally managing the multi-CPU device, however, this capability can cause complications.

In order to avoid management problems, the network adapter deliberately exposes its support of Option-ROM over only a single selected PCIe interface (even though all the PCIe interfaces connecting the network adapter to the multi-CPU device support Option-ROM). Moreover, the Option-ROM program code is designed to cause the multi-CPU device to present to a user only a single, non-redundant set of commands for managing all the multiple PCIe interfaces of the network adapter. Typically, the set of commands manage and configure the multiple PCIe interfaces via the single selected PCIe interface.

In some embodiments, the set of commands comprises a single, non-redundant set of (one or more) configuration menus for managing the network adapter, including monitoring and configuring the multiple PCIe interfaces. Several examples of such commands and menus are described herein.

In some embodiments, the network adapter is exposed to the host operating system as multiple different network devices corresponding to the multiple PCIe interfaces. In other embodiments, the network adapter is exposed to the host operating system as a single network device, which is shared by the multiple PCIe interfaces. In an embodiment, the user or the operating system may choose between the two modes of operation, e.g., during boot.

By using the disclosed techniques, an entire Socket-Direct network adapter is presented to the user as a single managed entity. At the same time, the commands presented by the Option-Rom code to the user (e.g., configuration menus) enable unified monitoring and configuration of the multiple PCIe interfaces of the network adapter.

SYSTEM DESCRIPTION

Figure 1:
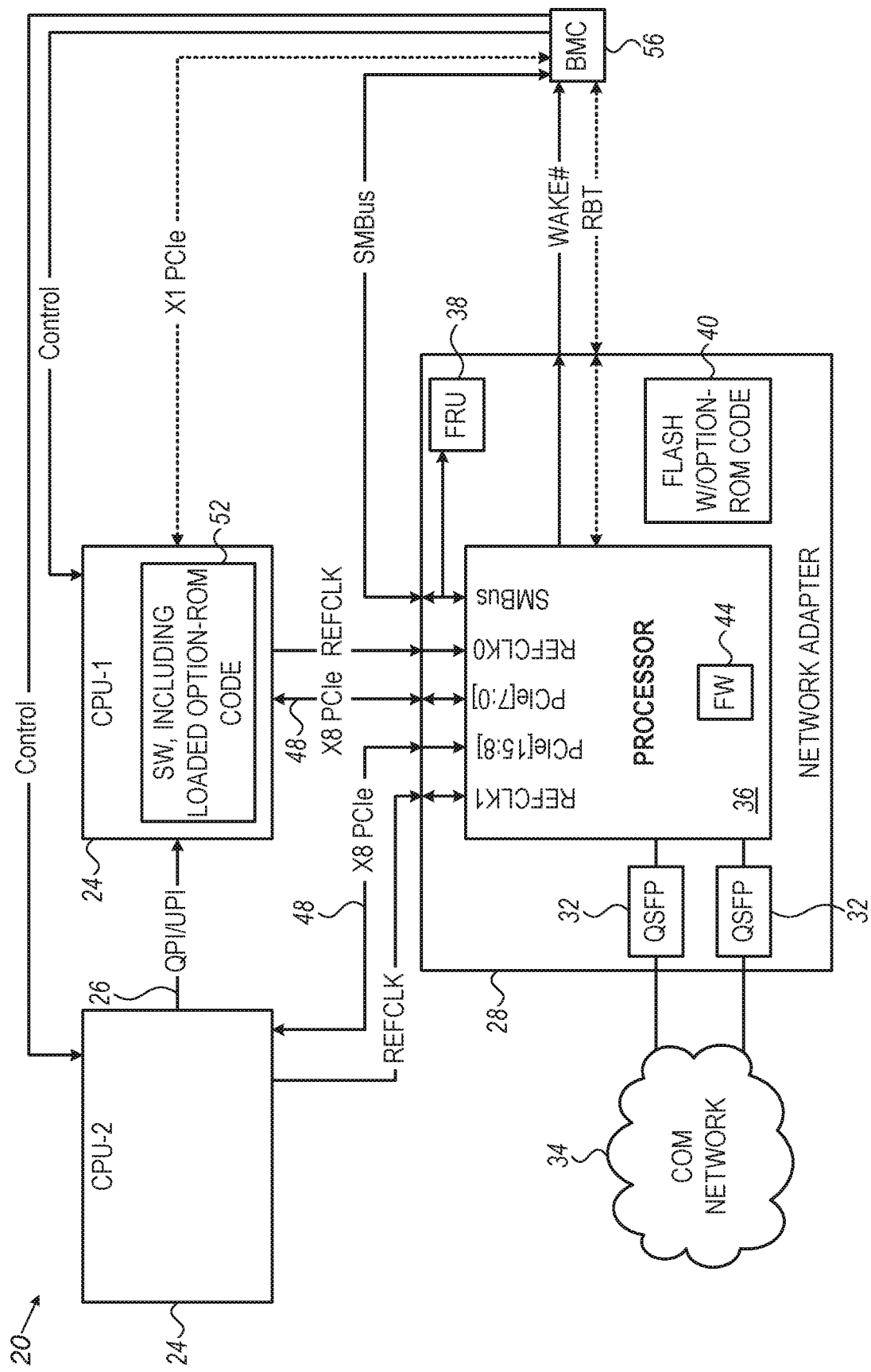
FIGS. 1 and 2 are block diagrams that schematically illustrate multi-CPU servers, in accordance with embodiments of the present invention.

FIG. 1 is a block diagram that schematically illustrates a multi-CPU server 20, in accordance with an embodiment of the present invention. The description that follows refers mainly to multi-CPU servers, for the sake of clarity. The disclosed techniques, however, are applicable to any other suitable multi-CPU device.

Multi-CPU server 20 comprises multiple Central Processing Units (CPUs) 24. The figure shows two CPUs 24, denoted "CPU-1" and "CPU-2", for the sake of clarity. In alternative embodiments, however, multi-CPU server 20 may comprise any suitable number of CPUs 24. Typically, multi-CPU server 20 runs a single Operating System (OS) that manages the multiple CPUs 24.

A network adapter 28 is used for connecting multi-CPU server 20 to a communication network 34. Network 34 may comprise, for example, an Ethernet or InfiniBand network. In the present example, multi-CPU server 20 and network adapter 28 are implemented as "Socket-Direct" devices. In such a configuration, network adapter 28 is connected directly to two or more individual CPUs 24, enabling the CPUs to communicate directly over network 34.

CPUs 24 within multi-CPU server 20 are also configured to communicate with one another using a suitable fabric, e.g., a Quick Path Interconnect (QPI) or Ultra Path Interconnect (UPI) fabric 26. For communicating with network 34, however, each CPU 24 typically communicates with network adapter 28 over a respective direct link, and not via the QPI/UPI fabric.

In the present example the direct links between CPUs 24 and network adapter 28 comprise Peripheral Component Interconnect Express (PCIe) bus interfaces 48. PCIe is specified, for example, by the PCI Special Interest Group (PCI-SIG), in "PCI Express Base Specification Revision 3.1a," Dec. 7, 2015, which is incorporated herein by reference. Each PCIe interface 48 operates independently of any other PCIe interface 48, and may serve one or more PCIe Physical Functions (PFs). Alternatively, other suitable bus interfaces can be used for this purpose.

In the disclosed embodiment, network adapter 28 comprises a plurality of PCIe interfaces 48, in the present example two eight-lane PCIe interfaces (labeled "X8 PCIe") of a bifurcated sixteen-lane PCIe Slot. Each PCIe interface 48 is configured for communicating with a corresponding CPU 24 of multi-CPU server 20 over a corresponding direct link. Each PCIe interface also receives a reference clock signal (labeled "REFCLK") from its respective CPU 24. Typically, each PCIe interface 48 of network adapter 28 is connected to its respective CPU 24 via a respective PCIe fabric. In the configuration FIG. 1, two separate PCIe fabrics connect PCIe interfaces 48 to their respective CPUs 24.

Network adapter 28 further comprises one or more network ports 32, in the present example two Quad Small Form-factor Pluggable (QSFP) ports, for connecting to network 34. Alternatively, any other suitable number and type of network ports can be used.

In some embodiments, a processor 36 is configured to carry out the various processing tasks of network adapter 28. Processor 36 is typically implemented using a combination of hardware and software. The software running on processor 36 is referred to herein as "Firmware" (FW) 44.

In an embodiment, network adapter 28 comprises a memory, typically a non-volatile memory such as a Flash device 40, which stores Option-ROM program code. During the boot process of multi-CPU server 28, CPUs 24 run a Built-In Operating System (BIOS) that loads and executes the Option-ROM program instructions. In the example of FIG. 1, loaded Option-ROM code 52 is seen running in CPU-1, purely for the sake of clarity. Generally, the Option-ROM code may load and run in any of CPUs 24.

The instructions of the Option-ROM code may instruct the BIOS to perform various tasks, for example loading the operating system of multi-CPU server 20 over network 34, configuring the parameters of network adapter 28, or any other suitable task.

In the embodiment of FIG. 1, multi-CPU server 20 further comprises a Baseboard Management Controller (BMC) 56, for communicating with a remote server (not shown) over network 34. By communicating with BMC 56, the remote server is capable of monitoring and configuring multi-CPU server 20.

In some embodiments, although not necessarily, BMC 56 is connected to network adapter 28 using a sideband interface. In the present example the sideband interface comprises a System Management Bus (SMBus). Remote management communication is thus exchanged between the remote server and BMC 56 over network 34, network adapter 28 and the sideband interface.

In an embodiment, network adapter 28 comprises a memory device referred to as "Field Replaceable Unit" (FRU) 38, which is also connected to the SMBus. FRU 38 is typically used for storing attributes such as Vendor-Name, Product-Name, Serial number, power-consumption requirements and others. The FRU is specified, for example, by Intel Corporation, Hewlett-Packard Company, NEC Corporation and Dell Computer Corporation, in "IPMI—Platform Management FRU Information, Storage Definition," v1.0, Document Revision 1.2, Feb. 28, 2013.

In the present embodiment, BMC 56 is also connected to network adapter 28 by a "RBT" interface allowing the BMC 56 to use pass-through traffic over network 34, and by a "WAKE#" interface for performing remote wake-up of multi-CPU server 20 over the network. BMC 56 is optionally connected to CPU-1 by a single-lane PCIe interface, and by respective control interfaces to CPU-1 and CPU-2. The single-lane PCIe interface enables BMC 56 to use a "host interface" over PCIe to allow the operating system to control and configure the BMC operation. The control interfaces allow BMC 56 to reset CPUs 24, as well as to monitor the CPUs' temperature and other CPU parameters such as cooling-fan speed. In addition, the single-lane PCIe interface enables the BMC to connect to network adapter 28 over PCIe, which allows for faster connection compared with RBT. One such use-case is MCTP over PCIe, as specified, for example, in "Management Component Transport Protocol (MCTP) PCIe VDM Transport Binding Specification," DMTF Document DSP0238, version 1.0.1, Dec. 11, 2009.

Figure 2:
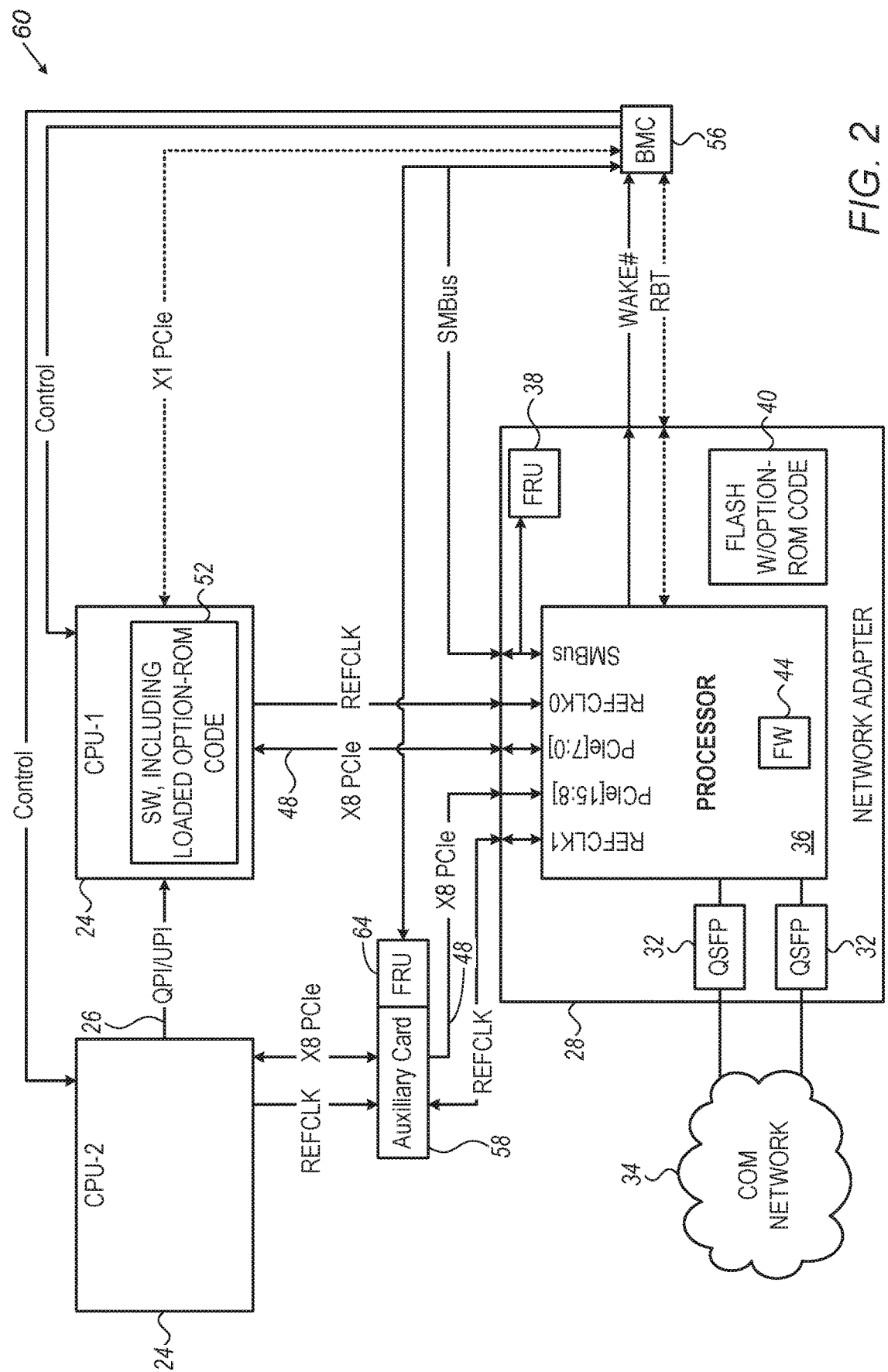

FIG. 2 is a block diagram that schematically illustrates a multi-CPU server 60, in accordance with an alternative embodiment of the present invention. Unlike the scheme of FIG. 1, in which network adapter 28 is connected to CPU-1 and CPU-2 using a single PCIe slot bifurcated into two eight-lane PCIe interfaces, the present embodiment uses two separate eight-lane PCIe slots. In multi-CPU server 60, an auxiliary card 58 is connected on the PCIe interface 48 between network adapter 28 and CPU-2. A memory (denoted FRU) 64 is coupled to auxiliary card 58, and is connected to the SMBus that also serves BMC 56. FRU 64 is used for identifying the additional hardware, as explained above with respect to FRU 38.

The use of two separate PCIe slots (as in FIG. 2) has certain advantages over a single bifurcated PCIe slot (as in FIG. 1), e.g., in that there is no need for dedicated hardware in the multi-CPU server for using a socket-direct network adapter. When using separate PCIe slots, it is sufficient that each CPU 24 has at least one PCIe slot associated with it, so that when plugging the two cards (main card with network adapter 28 to one slot, and auxiliary card 58 to the other slot) the multi-CPU server can operate the network adapter in socket-direct mode. Auxiliary card 58 and the main card comprising network adapter 28 are typically connected to one another using a suitable harness cable.

The multi-CPU server and network adapter configurations of FIGS. 1 and 2 are example configurations that are shown purely for the sake of conceptual clarity. Any other suitable multi-CPU device and/or network adapter configuration can be used in alternative embodiments. For example, a given multi-CPU server 20 or 60 may be connected to two or more network adapters 28. Additionally or alternatively, a given network adapter 28 may serve two or more multi-CPU servers 20 or 60.

Generally, not all of CPUs 24 need necessarily be connected directly to network adapter 28. The disclosed techniques are applicable in any such configuration. Depending on the network type, network adapter 28 may also be referred to as a Host Channel Adapter (HCA) or a Network Interface Controller (NIC), for example. Elements that are not necessary for understanding the principles of the disclosed techniques have been omitted from the figure for clarity.

In the example configuration shown in FIG. 1, network adapter 28 is implemented as a board or Integrated Circuit (IC) that is separate from the other elements of server 20. In alternative embodiments, however, network adapter 28 may be integrated with the hardware of server 20, for example.

The different elements of network adapter 28 may be implemented using any suitable hardware, such as in an Application-Specific Integrated Circuit (ASIC) or Field-Programmable Gate Array (FPGA). In some embodiments, some elements of network adapter 28 can be implemented using software, or using a combination of hardware and software elements.

In some embodiments, some or all of the functionality of CPUs 24 and/or processor 36 may be implemented using one or more programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Additional aspects of operating Socket-Direct network adapters in multi-CPU devices are addressed in U.S. Pat. No. 10,303,635, entitled "Remote host management using Socket-Direct network interface controllers," and in U.S. Pat. No. 10,318,312, entitled "Support of Option-ROM in Socket-Direct network adapters," whose disclosures are incorporated herein by reference.

Enhanced Configuration of Socket-Direct Network Adapter Using Option-Rom

As explained above, in some embodiments processor 36 of network adapter 28 exposes the support of Option-ROM functionality over only a single selected PCIe interface 48, even though the (one or more) other PCIe interfaces 48 support Option-ROM as well. The single selected PCIe interface 48 is referred to herein as a primary PCIe interface, and the (one or more) other PCIe interfaces 48 are referred to herein as auxiliary PCIe interfaces.

In some embodiments, the PCIe interface that uses the lowest PCIe lane (lane0) in processor 36 is chosen to be the primary PCIe interface. Alternatively, any other selection technique can be used.

By exposing only the primary PCIe interface as supporting Option-ROM, the entire network adapter 28 is presented to a user as a single managed entity. In particular, the Option-ROM code, when running on CPUs 24 during the boot process of the multi-CPU server, presents to the user only a single non-redundant set of commands (e.g., configuration menus) for managing network adapter 28 as a whole. (If both primary and auxiliary PCIe interfaces would have been exposed as supporting Option-ROM, the user would have been presented with multiple sets of configuration menus, which may lead to confusion, errors and possibly contradictory configurations of different PCIe interfaces 48.)

In the present context, the term "presenting to a user" refers to presentation both to a local user who operates the multi-CPU server directly, and to a remote user who operates the multi-CPU server from a remote server over network 34 using BMC 56, or via an out-of-band network (not shown) connected directly to BMC 56.

Moreover, in some embodiments, the single set of commands (presented to the user by the Option-ROM code when running on CPUs 24) comprises commands for managing both the primary and auxiliary PCIe interfaces of network adapter 28. The term "managing a PCIe interface" refers to both monitoring parameters of the PCIe interface, and configuring parameters of the PCIe interface. By using such a unified set of commands, the user is able to manage (monitor and/or configure) the network adapter with its multiple PCIe interfaces without risk of confusion or error.

Figure 3:
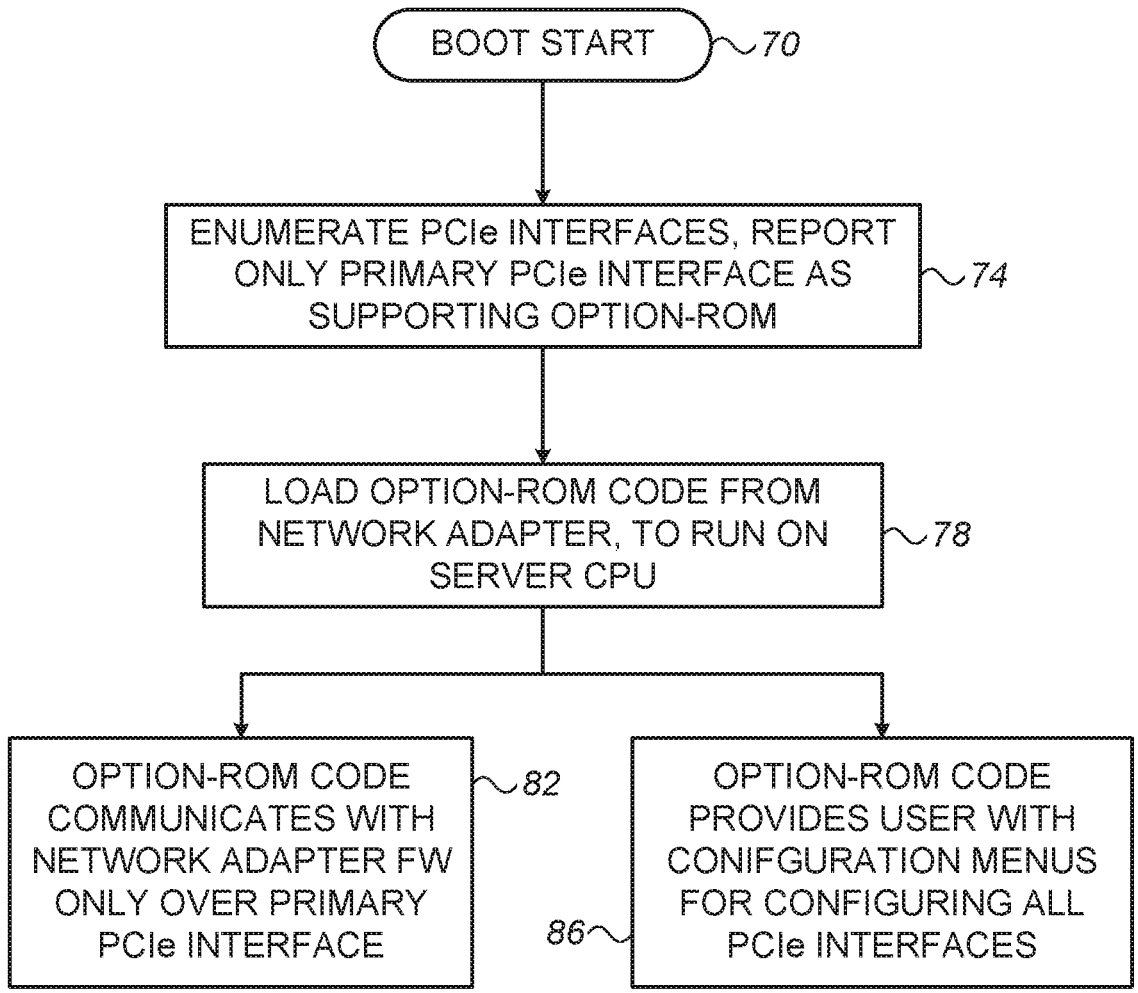
FIG. 3 is a flow chart that schematically illustrates a method for configuring a Socket-Direct network adapter during bootstrapping of a multi-CPU server, in accordance with an embodiment of the present invention.

FIG. 3 is a flow chart that schematically illustrates a method for configuring Socket-Direct network adapter 28 during bootstrapping of multi-CPU server 20 or 60, in accordance with an embodiment of the present invention. The method begins with the BIOS of CPUs 24 of the multi-CPU server starting a bootstrapping ("boot") process, e.g., on power-up or reset, at a boot initiation step 70.

At a PCIe enumeration step 74, the BIOS running on CPUs 24 enumerates the PCIe interfaces found on the multi-CPU server, including PCIe interfaces 48 of network adapter 28. As explained above, processor 36 of network adapter 28 reports support of Option-ROM functionality only over the primary PCIe interface 48.

At a loading step 78, the BIOS loads the Option-ROM code, from network adapter 28. CPUs 24 begin executing boot code 52, including the Option-ROM code.

At a communication step 82, the Option-ROM code running on CPUs 24 communicates with FW 44 of network adapter 28 only via the primary PCIe interface 48. At a presentation step 86, the Option-ROM code running on CPUs 24 presents to the user (locally or via BMC 56) a single non-redundant set of commands for managing network adapter 28, including managing both the primary and auxiliary PCIe interfaces 48. The user manages (e.g., monitors and/or configures) network adapter 28 using the presented commands.

In essence, the set of commands (e.g., configuration menus) presented to the user form an interface between CPUs 24 and FW 44 of network adapter 28. This interface is used, among other tasks, for managing the network adapter.

Example Monitoring & Configuration Commands

In various embodiments, the Option-ROM code running on CPUs 24 during boot may present various commands to the user for managing network adapter 28. Some commands may manage all Physical Functions (PFs) of all PCIe interfaces (primary and auxiliary) jointly, whereas other commands may manage a specific PF (on a primary or auxiliary PCIe interface). Yet other commands may manage a selected subset of PFs, e.g., the PFs associated with a given PCIe interface.

Examples of commands for managing a selected PF may comprise one or more commands that enable the user to set values to local parameters that are specific per PF, e.g., configuration space settings, Quality-of-Service (QoS) resources, Medium Access Control (MAC) address and the like.

Other examples of commands for managing a selected PF may comprise one or more commands that enable the user to query the values of local parameters that are specific per PF, e.g., the local parameters listed above.

Typically, a command that pertains to a specific PCIe interface 48 (including a command pertaining to a specific PF on a specific PCIe interface 48) comprises a field (e.g., a 4-bit field) that specifies the index of that PCIe interface.

Examples of commands for managing all the PFs jointly may comprise one or more commands that enable the user to set global parameters that pertain to all the PFs in network adapter 28, e.g., setting a physical port number and other parameters and state relating to the physical port (e.g., to any of ports 32 in FIGS. 1 and 2).

Other examples of commands for managing all the PFs jointly may comprise one or more commands that enable the user to query the values of global parameters, e.g., the NIC part number and/or manufacturing date.

Other commands may enable the user to manage a global resource of network adapter 28 by FW 44, e.g., to enable or disable a physical port (port up/down). Such global resources of the network adapter are typically managed on a permission basis, which may be by itself configurable by a command in the set. For example, a decision by FW 44 to disable a physical port typically requires a permission from all the connected clients of the port, so as to prevent a driver from disconnecting a connection of another driver.

In some embodiments, the Option-ROM code running on CPUs 24 may present the set of commands as a set of Human Interface Infrastructure (HII) configuration menus. Typically, the Option-ROM code exposes the set of menus on the primary PCIe interface. Management of auxiliary PCIe interfaces may be performed using sub-menus in the set of menus. For example, the Option-ROM code may present a sub-menu for setting or querying a local parameter relating to an auxiliary PCIe interface, e.g., a MAC address for a PF associated with an auxiliary PCIe interface. The use of sub-menus eliminates the need to synchronize settings between different HII menus. In an embodiment, each sub-menu is associated with a given PCIe bus ID (as will be defined below).

In some embodiments, the Option-ROM code running on CPUs 24 uses certain commands to set and/or obtain parameters from FW 44 in processor 36 of network adapter 28. These commands typically specify the PCIe bus identifier (ID) for which the command is issued. In addition, FW 44 typically exposes to the Option-ROM code the fact that the FW operates in Socket-Direct mode, and the total number of PCIe interfaces configured in network adapter 28.

As noted above, the PCIe interface occupying PCIe lane 0 is typically selected to serve as the primary PCIe interface. The auxiliary PCIe interfaces are enumerated successively with PCIe bus IDs, according to the PCIe lanes they occupy. For example, in this embodiment, a sixteen-lane (×16) PCIe bus partitioned into four buses will be enumerated as follows:

| PCIe lanes | PCIe bus ID | Description |
| --- | --- | --- |
| 3:0 | 0 | Primary |
| 7:4 | 1 | Auxiliary [1] |
| 11:8 | 2 | Auxiliary [2] |
| 15:12 | 3 | Auxiliary [3] |

In some embodiments, FW 44 in processor 36 of network adapter 28 sends Vendor Provided Data (VPD) on each PCIe interface 48, in response to requests from the Option-ROM code running on CPUs 24. The VPD comprises a description of the relevant PCIe device. In some embodiments, FW 44 indicates in the VPD whether the PCIe interface is a primary or auxiliary PCIe interface. For example, FW 44 may add a "-Prime" suffix to a given field in the VPD when responding via the primary PCIe interface, and a "-Aux[n]" suffix to the given field in the VPD when responding via an auxiliary PCIe interface, wherein n denoted the PCIe bus ID associated with the auxiliary PCIe interface in question. For common parameters (e.g., FW version of FW 44, part number and serial number of adapter 28), FW 44 typically exposes identical values on the primary and auxiliary PCIe interfaces.

In a typical flow of operations (although not necessarily), when the Option-ROM code starts running on CPUs 24, the Option-ROM code queries FW 44 for the FW mode of operation. If FW 44 reports that it operates in Socket-Direct mode, the Option-ROM code queries the FW for the number of PCIe interfaces. The Option-ROM code then assigns a respective HII form for every PCIe interface. For this form, the FW and the Option-ROM code expose all the available PFs and their attributes, including, for example, the MAC/GUID assigned to each PF.

In some embodiments, FW 44 is designed to operate with various host systems, which do not necessarily all support Socket-Direct operation. Thus, in order to maintain interoperability, selection of auxiliary PCIe interfaces is implemented using reserved fields in FW commands. A default value of zero ensures backward compatibility for host systems that do not support Socket-Direct.

Additionally or alternatively, the Option-ROM code running on CPUs 24 during boot may present one or more of the following commands to the user:

Wake On LAN (WOL) and/or Reboot On LAN (ROL) commands—Commands that enable assigning a specific PF to use the WAKE# signal for WOL and/or ROL functionality. For example, QUERY_WOL_ROL—A command for querying the WOL and ROL settings for a specific PF; and SET_WOL_ROL—A command for configuring WOL and ROL for a specific PF.

QUERY_VIRTUAL_MAC—A command for querying the MAC address assigned to a PF, when the MAC address is not the address set during production.

SET_VIRTUAL_MAC—A command for configuring a PF with a MAC address that is different from the address assigned at production time.

QUERY_VIRTUAL_PARAMETERS—A command for querying the settings of an InfiniBand Virtual Link.

SET_VIRTUAL_PARAMETERS—A command for setting the settings of an InfiniBand Virtual Link.

MPEIN—A command for accessing a PCIe information register that provides information such as the number of PFs on the PCIe bus, PCIe bus index, number of PCIe lanes, enumeration information, PCIe bus speed, power requirements from the PCIe slot, etc.

NVDA—A command for accessing non-volatile configuration parameters. (Note that some non-volatile parameters, which configure settings per PF or per PCIe bus, can be configured and/or queried using the HII menus using all the techniques described above.)

The commands, menus and other features described above are non-limiting examples that are chosen purely for the sake of conceptual clarity. In alternative embodiments, any other suitable commands, menus and/or other features can be used.

Network-Device-Per-PCIE-Interface and Shared-Network-Device Modes

In some embodiments, the Option-ROM code exposes network adapter 28 to the Operating System (OS) of the multi-CPU server (server 20 or 60) as multiple different network devices corresponding to the multiple PCIe interfaces 48. In other words, each PCIe device (corresponding to a PCIe interface 48) is presented to the OS as a separate logical network adapter having separate attributes. This mode of operation is referred to herein as "network device per PCIe interface."

In other embodiments, the Option-ROM code exposes network adapter 28 to the OS as a single network device, which is shared by the multiple PCIe interfaces 48. This mode of operation is referred to herein as "shared network device." See, for example, U.S. Pat. No. 10,318,312, cited above.

Typically, the same hardware of network adapter 28 supports both modes of operation, and the desired mode of operation is set in FW 44 and in the Option-ROM code running on CPUs 24. Some aspects of the set of commands presented to the user may differ between the "network device per PCIe interface" and "shared network device" modes.

For example, in the "shared network device" mode there is no need for separate management (setting/querying) of parameters of software layers that use the network device (e.g., there is no need to configure separate MAC addresses for PFs on auxiliary PCIe interfaces). PCIe related parameters, such as PF enablement, is nevertheless managed separately in both modes.

In some embodiments, the user or the OS may choose between the "network device per PCIe interface" and "shared network device" modes, e.g., during boot or during normal operation. In one embodiment, the pre-boot environment (e.g., BIOS) of the multi-CPU server uses the HII menus to expose on the primary PCIe interface a menu item that prompts the user to choose between the "network device per PCIe interface" and "shared network device" modes. In another embodiment, the OS enables an administrator to choose which of the "network device per PCIe interface" and "shared network device" modes to configure. This information is saved persistently in the OS file system and/or in the non-volatile configuration parameters of network adapter 28.

In an embodiment, if a shared device is chosen, the HII attributes provided in a shared menu and the per-device sub-menus are disabled.

Although the embodiments described herein mainly address multi-CPU servers, the methods and systems described herein can also be used in other applications, such as in various other multi-CPU devices such as storage platforms, high-performance routers and others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
one or more network ports configured to communicate with a communication network;
multiple bus interfaces, configured to communicate with multiple respective Central Processing Units (CPUs) of a multi-CPU device; and
a processor, which is comprised in the network adapter and is configured to:
support an Option-ROM functionality, in which the network adapter holds Option-ROM program instructions that are loadable and executable by the multi-CPU device during a boot process;
report the support of the Option-ROM functionality to the multi-CPU device over only a single bus interface, selected from among the multiple bus interfaces; and
by loading the Option-ROM program instructions to the multi-CPU device, cause the multi-CPU device to present to a user only a single, non-redundant set of commands for managing all the multiple bus interfaces of the network adapter via the single bus interface.

2. The network adapter according to claim 1, wherein, in response to a request from the multi-CPU device to report the support of the Option-ROM functionality, the processor is configured to report the support of the Option-ROM functionality over only the single bus interface, even though all the multiple bus interfaces of the network adapter support the Option-ROM functionality.

3. The network adapter according to claim 1, wherein the single, non-redundant set of commands comprises a single, non-redundant set of one or more configuration menus for managing at least the multiple bus interfaces.

4. The network adapter according to claim 1, wherein the multiple bus interfaces are configured to communicate with the multi-CPU device over a Peripheral Component Interconnect Express (PCIe) bus.

5. The network adapter according to claim 4, wherein the single, non-redundant set of commands comprises a command for managing a local parameter of a selected PCIe Physical Function (PF).

6. The network adapter according to claim 4, wherein the single, non-redundant set of commands comprises a command for managing a global parameter pertaining to two or more PCIe Physical Functions (PFs) associated with one or more of the bus interfaces.

7. The network adapter according to claim 1, wherein the single, non-redundant set of commands comprises a command for managing a global resource of the network adapter.

8. The network adapter according to claim 1, wherein the multi-CPU device comprises a multi-CPU server.

9. The network adapter according to claim 1, wherein the processor is configured to present the single, non-redundant set of commands by presenting a single, non-redundant set of configuration menus to the user.

10. The network adapter according to claim 9, wherein the processor is configured to present the set of configuration menus in association with the single selected bus interface, including presenting, within the set of configuration menus, one or more sub-menus for managing one or more bus interfaces other than the single selected bus interface.

11. The network adapter according to claim 1, wherein the processor is configured to present the network adapter to an operating system of the multi-CPU device as multiple logical network adapters corresponding to the multiple bus interfaces.

12. The network adapter according to claim 1, wherein the processor is configured to present the network adapter to an operating system of the multi-CPU device as a single logical network adapter that is shared by the multiple bus interfaces.

13. The network adapter according to claim 1, wherein the processor is configured to select, in response to user input, whether to present the network adapter to an operating system of the multi-CPU device as multiple logical network adapters corresponding to the multiple bus interfaces, or as a single logical network adapter that is shared by the multiple bus interfaces.

14. A method, comprising:
in a network adapter, communicating with a communication network via one or more ports, and communicating via multiple bus interfaces with multiple respective Central Processing Units (CPUs) of a multi-CPU device;
supporting in the network adapter an Option-ROM functionality, by holding in the network adapter Option-ROM program instructions that are loadable and executable by the multi-CPU device during a boot process;
reporting the support of the Option-ROM functionality to the multi-CPU device over only a single bus interface, selected from among the multiple bus interfaces; and by loading the Option-ROM program instructions to the multi-CPU device, causing the multi-CPU device to present to a user only a single, non-redundant set of commands for managing all the multiple bus interfaces of the network adapter via the single bus interface.

15. The method according to claim 14, wherein reporting the support of the Option-ROM functionality over only the single bus interface is performed in response to a request from the multi-CPU device to report the support of the Option-ROM functionality, even though all the multiple bus interfaces of the network adapter support the Option-ROM functionality.

16. The method according to claim 14, wherein causing the multi-CPU device to present the single, non-redundant set of commands comprises causing the multi-CPU device to present a single, non-redundant set of one or more configuration menus for managing at least the multiple bus interfaces.

17. The method according to claim 14, wherein communicating via the multiple bus interfaces comprises communicating with the multi-CPU device over a Peripheral Component Interconnect Express (PCIe) bus.

18. The method according to claim 17, wherein causing the multi-CPU device to present the single, non-redundant set of commands comprises causing the multi-CPU device to present a command for managing a local parameter of a selected PCIe Physical Function (PF).

19. The method according to claim 17, wherein causing the multi-CPU device to present the single, non-redundant set of commands comprises causing the multi-CPU device to present a command for managing a global parameter pertaining to two or more PCIe Physical Functions (PFs) associated with one or more of the bus interfaces.

20. The method according to claim 14, wherein causing the multi-CPU device to present the single, non-redundant set of commands comprises causing the multi-CPU device to present a command for managing a global resource of the network adapter.

21. The method according to claim 14, wherein the multi-CPU device comprises a multi-CPU server.

22. The method according to claim 14, wherein causing the multi-CPU device to present the single, non-redundant set of commands comprises causing the multi-CPU device to present a single, non-redundant set of configuration menus to the user.

23. The method according to claim 22, wherein presenting the configuration menus comprises presenting the set of configuration menus in association with the single selected bus interface, including presenting, within the set of configuration menus, one or more sub-menus for managing one or more bus interfaces other than the single selected bus interface.

24. The method according to claim 14, and comprising presenting the network adapter to an operating system of the multi-CPU device as multiple logical network adapters corresponding to the multiple bus interfaces.

25. The method according to claim 14, and comprising presenting the network adapter to an operating system of the multi-CPU device as a single logical network adapter that is shared by the multiple bus interfaces.

26. The method according to claim 14, and comprising selecting, in response to user input, whether to present the network adapter to an operating system of the multi-CPU device as multiple logical network adapters corresponding to the multiple bus interfaces, or as a single logical network adapter that is shared by the multiple bus interfaces.

27. A computer software product, the product comprising a tangible non-transitory computer-readable medium in which program instructions are stored, which instructions, when read by a processor of a network adapter that is configured to communicate with a communication network via one or more network ports and to communicate with multiple respective Central Processing Units (CPUs) of a multi-CPU device via multiple bus interfaces, cause the processor to:
  support an Option-ROM functionality, in which the network adapter holds Option-ROM program instructions that are loadable and executable by the multi-CPU device during a boot process;
  report the support of the Option-ROM functionality to the multi-CPU device over only a single bus interface, selected from among the multiple bus interfaces; and
  by loading the Option-ROM program instructions to the multi-CPU device, cause the multi-CPU device to present to a user only a single, non-redundant set of commands for managing all the multiple bus interfaces of the network adapter via the single bus interface.

* * * * *